United States Patent Office 3,637,892
Patented Jan. 25, 1972

3,637,892
PROCESS FOR THE PREPARATION OF OLEFINS
Brian Patrick McGrath, Crowthorne, Berkshire, and Christopher Patrick Cadman Bradshaw, Sunbury-on-Thames, Middlesex, England, assignors to The British Petroleum Company Limited, London, England
No Drawing. Filed Feb. 6, 1968, Ser. No. 703,266
Claims priority, application Great Britain, Feb. 13, 1967, 6,749/67, Patent 1,159,053
Int. Cl. C07c 3/62
U.S. Cl. 260—683 D    17 Claims

ABSTRACT OF THE DISCLOSURE

Olefins are prepared by coreacting an acyclic olefin of formula $R(R_1)C=CR_2(R_3)$ where the R substituents represent hydrogen atoms, alkyl or aryl groups, and an easily polymerisable olefin e.g. isobutene, in the presence of a catalyst comprising a carbonyl of molybdenum, tungsten or rhenium supported on alumina, silica or silica-alumina, the support having been modified by the addition of alkali or alkaline earth metal ions thereto. Catalysts modified in this way catalyse the coreaction of the olefins without polymerising the easily polymerisable olefin to any great extent.

---

This invention relates to a process for the production of olefins.

Our U.S. Patent No. 3,526,676 discloses and claims a process for the preparation of olefins which process comprises reacting an initial mixture of two dissimilar acyclic olefins having the formulae $R(R_1)C=C(R_2)R_3$ and $R_4(R_5)C=C(R_6)R_7$ respectively, in the presence of an olefin disproportionation catalyst, the R substituents of the feed olefins representing hydrogen atoms or alkyl or aryl groups, with the proviso that not more than two of the groupings $R(R_1)C<$, $R_3(R_2)C<$, $R_4(R_5)C<$, or $R_7(R_6)C<$ are the same.

A disproportionation catalyst is a catalyst which is capable of effecting the conversion of an olefin to a mixture of olefins having higher and lower carbon numbers than the feed olefin. Such catalysts include mixtures of molybdenum oxide and alumina, preferably containing cobalt oxides, and optionally containing minor amounts of alkali metal or alkaline earth metal ions, molybdenum, tungsten or rhenium carbonyls supported on alumina, silica or silica/alumina, tungsten oxide supported on alumina and rhenium heptoxide supported on alumina.

It is known that certain olefins, e.g., isobutene, polymerise very readily. For this reason it has not, to date, been possible to co-react a mixture of olefins containing an easily polymerisable olefin over a disproportionation catalyst without substantial polymerisation of the feed occurring.

It is an object of the present invention to provide a process for the preparation of olefins by the reaction of an olefinic mixture containing an easily polymerisable olefin, e.g., isobutene, over a disproportionation catalyst.

We have now discovered that if the support of a molybdenum carbonyl, tungsten carbonyl or rhenium carbonyl on alumina and/or silica catalyst is modified by the addition of a minor proportion of alkali or alkaline earth metal ions before combining with the carbonyl then the catalyst is suitable for use for the co-reaction of an olefin mixture containing an easily polymerisable olefin and does not polymerise the olefin to any great extent.

Commercially obtainable alumina and silica usually contain a minor proportion of alkali metal ions derived from the process of manufacture. In the case of alumina a typical quantity is about 0.03% by weight of sodium ions. However the present invention is based on the discovery that selective catalysts may be obtained by adding to the alumina and/or silica support before combining with the carbonyl a minor proportion of alkali or alkaline earth metal ions over and above the quantity resulting from the process of manufacture. We believe that the alkali or alkaline earth metal ions are deposited on the surface of the support.

Thus according to the present invention there is provided a process for the preparation of olefins which process comprises reacting an initial mixture of an acyclic olefin of formula $R(R_1)C=C(R_2)R_3$, the R substituents representing hydrogen atoms or alkyl or aryl groups, with an easily polymerisable olefin in the presence of a catalyst comprising a carbonyl of molybdenum, tungsten or rhenium, supported on silica and/or alumina, the catalyst support having been modified by adding thereto a minor proportion of alkali or alkaline earth metal ions prior to combining the support with the carbonyl.

Preferably the catalyst contains 0.1–20% by weight of the carbonyl supported on the alumina and/or silica.

The optimum metal ion content depends upon the choice of support, the transition metal carbonyl and the metal ion. Catalysts containing too little metal ion will retain some polymerisation activity, whilst those containing too much will have a reduced catalytic effect on the co-reaction of the olefins.

Sodium, potassium and calcium ions are the preferred alkali or alkaline earth metal ions and alumina is the preferred support. In these instances, the catalyst should contain 0.02–5.0% by weight of added metal ion, preferably 0.1–1.0% by weight.

The incorporation of the alkali or alkaline earth metal ions into the catalyst support for use in the present invention may be brought about by known methods, for example, by treating the support with an aqueous solution of a alkali metal salt such as sodium carbonate, sodium bicarbonate or sodium acetate, separating the solid material from the liquid medium and drying.

Before or after incorporation of the alkali or alkaline earth metal ions the support may be subjected to thermal activation, either in a stream of an inert gas such as nitrogen, carbon dioxide or helium, or preferably in a stream of air or oxygen followed by a final treatment in an inert gas. Suitably the support is treated in air at a temperature in the range 100–800° C., preferably 300–600° C. for 1 minute to 20 hours and then under similar conditions with an inert gas such as nitrogen.

The activated support may then be impregnated with a solution of the carbonyl compound. The latter may, for example, be dissolved in a hydrocarbon solvent.

Optionally the catalyst may be treated with an inert gas at a temperature in the range 20 to 500° C., preferably 60 to 200° C., prior to passing the mixed olefin feedstock over it.

Suitable easily polymerisable olefins include tertiary olefins containing the grouping

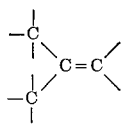

and secondary olefins containing the grouping

Ar—CH=C< wherein Ar represents an aromatic radical.

The preferred easily polymerisable olefin is isobutene.

A very suitable feedstock for the process is a mixture consisting essentially of butene-2 and isobutene since the reaction products, propylene and 2-methylbutene-2 are very desirable olefins. The uses of propylene are too well-known to require elaboration and 2-methyl-butene-2 on dehydrogenation yields isoprene.

The conditions under which the olefins react vary with the composition of the feed, the catalyst, and the desired products.

Reaction temperatures may range from −20° to +500° C. For a molybdenum carbonyl on alumina catalyst the temperature is preferably in the range 20 to 150° C., for a tungsten carbonyl on alumina catalyst the temperature is preferably in the range 20 to 150° C. and for a rhenium carbonyl on alumina catalyst the temperature is preferably in the range 20 to 200° C.

Reaction pressures may be in the range 0–2000 p.s.i.g.

In a continuous process, reaction times may vary between 0.01 second and 10 hours, preferably between 0.1 second and 1 hour for tungsten and molybdenum catalysts and 0.1 second and 10 minutes for rhenium catalysts.

In a batch process, suitable olefin/catalyst weight ratios are in the range 1000:1 to 1:1.

If desired, the process may be carried out in the presence of an inert diluent, for example a paraffinic or cycloparaffinic hydrocarbon. The process may be carried out batchwise or in a continuous manner, using the catalyst in the form of a fixed bed, a fluidised bed or a moving bed.

The invention is illustrated by the following examples.

It is to be understood that Example 1 is provided for purposes of comparison only and is not in accordance with the present invention.

EXAMPLE 1

An alumina of surface area 250 m.²/g., pore volume 0.37 cc./g. and an average pore diameter of 50 A. was heated to 580° C. in nitrogen for 2 hours. The product was then treated with a solution containing 0.05 g. molybdenum carbonyl per gram alumina dissolved in boiling cyclohexane. Surplus molybdenum carbonyl was removed from the alumina by continuous extraction with hot cyclohexane for 16 hours. Finally, the solvent was removed under reduced pressure at room temperature. The product contained about 0.7% by weight of molybdenum and 0.03% by weight of sodium.

A mixed olefinic feedstock was then passed over the catalyst. Reaction conditions and reaction products are given in the following table.

EXAMPLE 2

A further sample of the alumina heated in nitrogen gas described in Example 1 was treated for 24 hours at room temperature with a continuously circulating solution of 0.1 N NaHCO₃. The product was filtered free from excess bicarbonate, dried at 110° C. and heated to 580° C. for 2 hours in nitrogen. Molybdenum carbonyl was then introduced by the method described in Example 1 to give a product containing 0.7% by weight of molybdenum and 0.25% by weight of sodium.

The mixed olefin feedstock was passed over this catalyst and reaction conditions and products are again shown in the following table.

TABLE

Feed (percent wt.): isobutane, 1.3; n-butane, 7.9; butene-1, 5.3; butene-2, 44.2; isobutene, 41.3.
Conditions: 90° C.; GHSV, 2,000; 1 atm.

| | Example No. | |
|---|---|---|
| | 1 | 2 |
| Mo, percent wt | 0.7 | 0.7 |
| Na, percent wt | Trace | 0.2 |
| Products: | | |
| Ethylene | 0.2 | 0.1 |
| Propylene | 0.9 | 9.7 |
| Isobutane | 2.1 | 2.1 |
| n-Butane | 7.5 | 7.6 |
| Butene-1 | 2.2 | 2.0 |
| Butene-2 | 29.7 | 29.4 |
| Isobutene | 23.1 | 36.6 |
| 3-methylbutene-1 | 0.1 | Trace |
| 2-methylbutene-1 | 0.9 | 0.5 |
| 2-methylbutene-2 | 6.7 | 9.1 |
| Pentene-1 | 0.1 | Trace |
| Pentene-2 | 2.8 | 2.9 |
| Hexenes | 0.6 | Trace |
| Polymer (>C₆) | 15.2 | (¹) |
| Total | 100.1 | 100.0 |

¹ None.

Comparison of the two product spectra shows that the sodium ion treatment completely eliminated polymerisation of the easily polymerisable isobutene and allowed considerably more co-reaction to take place, (cf. 2-methylbutene-2 production).

Our British Patent No. 1,159,054 claims a process for the preparation of olefins comprising reacting an initial mixture of an acyclic olefin of formula $$R(R_1)C=C(R_2)R_3$$

the R substituents representing hydrogen atoms or alkyl or aryl groups, with an easily polymerisable olefin in the presence of a catalyst comprising molybdena supported on alumina, wherein the alumina support or the molybdena on alumina catalyst has been modified by the addition of a minor proportion of alkali or alkaline earth metal ions thereto.

Our British Patent No. 1,116,243 discloses and claims a catalyst suitable for use in the disproportionation of acyclic olefins, the catalyst comprising rhenium carbonyl supported on alumina.

What we claim is:

1. A process for the preparation of propylene and isopentenes which comprises passing a feedstock comprising normal butenes and isobutene, said isobutene being an easily polymerizable olefin subject to substantial polymerization over a disproportionation catalyst, over a catalyst comprising a carbonyl of molybdenum, tungsten or rhenium supported on silica and/or alumina in which the catalyst support before combination with the carbonyl is modified by depositing on the surface thereof from 0.02 to 5.0% by weight of alkali or alkaline earth metal ions.

2. A process according to claim 1 wherein the catalyst contains 0.1–20% by weight of the carbonyl supported on the alumina and/or silica.

3. A process according to claim 1 wherein the alkali or alkaline earth metal ions are sodium, potassium or calcium and the support is alumina.

4. A process according to claim 1 wherein the catalyst contains 0.1–1.0% by weight of metal ions.

5. A process according to claim 1 wherein before or after incorporation of the alkali or alkaline earth metal ions the support is subjected to thermal activation, either in a stream of an inert gas such as nitrogen, carbon dioxide or helium, or in a stream of air or oxygen followed by a final treatment in an inert gas.

6. A process according to claim 5 wherein the support is treated in air at a temperature in the range 100–800° C. for 1 minute to 20 hours and then under similar conditions with an inert gas such as nitrogen.

7. A process according to claim 6 wherein the support is treated in air at 300–600° C.

8. A process according to claim 1 wherein the feedstock consists essentially of butene-2 and isobutene.

9. A process according to claim 1 wherein the reaction temperature is in the range −20° C. to +500° C.

10. A process according to claim 9 wherein the catalyst comprises molybdenum carbonyl on alumina or tungsten carbonyl on alumina and the temperature is in the range 20 to 150° C.

11. A process according to claim 9 wherein the catalyst comprises rhenium carbonyl on alumina and the temperature is in the range 20 to 200° C.

12. A process according to claim 1 wherein the reaction pressure is in the range 0–2000 p.s.i.g.

13. A continuous process according to claim 1 wherein the reaction time varies between 0.01 second and 10 hours.

14. A process according to claim 13 wherein the catalyst is a tungsten or molybdenum catalyst and the reaction time lies between 0.1 seconds and 1 hour.

15. A process according to claim 13 wherein the catalyst is a rhenium catalyst and the reaction time lies between 0.1 second and 10 minutes.

16. A batch process according to claim 1 wherein the olefin/catalyst weight ratio is in the range 1000:1 to 1:1.

17. A process according to claim 1 wherein the process is carried out in the presence of an inert diluent, for example a paraffinic or cycloparaffinic hydrocarbon.

References Cited

UNITED STATES PATENTS

| | | | |
|---|---|---|---|
| 3,201,493 | 8/1965 | Meisinger et al. | 260—683.2 |
| 3,204,009 | 8/1965 | Keith | 260—683.2 |
| 3,236,909 | 2/1966 | Winnick | 260—683.2 |
| 3,457,320 | 7/1969 | Stapp et al. | 260—683 |
| 3,261,879 | 7/1966 | Banks | 260—683 |
| 3,485,889 | 12/1969 | Williams et al. | 260—683 |
| 3,526,676 | 9/1970 | Turner et al. | 260—683 |

DELBERT E. GANTZ, Primary Examiner

C. E. SPRESSER, Jr., Assistant Examiner

U.S. Cl. X.R.

260—668, 677